United States Patent [19]

Brännström et al.

[11] Patent Number: 4,767,315

[45] Date of Patent: Aug. 30, 1988

[54] METHOD OF CONTROLLING THE DEPTH OF A FLUIDIZED BED IN A POWER PLANT AND A POWER PLANT WITH MEANS FOR CONTROLLING THE BED DEPTH

[75] Inventors: Roine Brännström, Finspong; Lars-Erik Karlsson, Åby; Martin Mansson, Finspong, all of Sweden

[73] Assignee: Asea Stal Aktiebolag, Västerås, Sweden

[21] Appl. No.: 917,649

[22] Filed: Oct. 10, 1986

[30] Foreign Application Priority Data

Oct. 22, 1985 [SE] Sweden ............................... 8504961

[51] Int. Cl.[4] .................................................. F23D 3/40
[52] U.S. Cl. ........................................ 431/7; 122/4 D; 110/347; 110/232; 431/170
[58] Field of Search ................... 431/7, 170; 122/4 D; 110/346, 347, 101 CA, 245, 232

[56] References Cited

U.S. PATENT DOCUMENTS

| | | | |
|---|---|---|---|
| 2,402,170 | 6/1946 | Lund | 241/246 |
| 4,223,529 | 9/1980 | Willyoung | 122/4 D |
| 4,240,377 | 12/1980 | Johnson | 431/170 |
| 4,284,401 | 8/1981 | Tate bayashi et al. | 431/7 |
| 4,397,248 | 8/1983 | Mehta et al. | 110/347 |
| 4,421,036 | 12/1983 | Brannstrom et al. | 110/186 |
| 4,438,709 | 3/1984 | Borio et al. | 110/347 |
| 4,528,918 | 7/1985 | Sato et al. | 110/347 |
| 4,584,949 | 4/1986 | Brannstrom | 431/7 |
| 4,622,922 | 11/1986 | Miyagaki et al. | 122/4 D |
| 4,667,610 | 5/1987 | Meier et al. | 431/7 |

FOREIGN PATENT DOCUMENTS

| | | | |
|---|---|---|---|
| 0167992 | 1/1986 | European Pat. Off. | 431/170 |
| 2935542 | 3/1980 | Fed. Rep. of Germany | 431/170 |
| 3112120 | 10/1982 | Fed. Rep. of Germany | 431/7 |

Primary Examiner—Carroll B. Dority, Jr.

[57] ABSTRACT

The bed depth in a power plant burning sulfur-containing fuel in a fluidized bed of material which constitutes a sulfur absorbent in a combustion chamber is controlled on the basis of plant power output. A plurality of sensors connected to the combustion chamber determine the existing bed depth. A bed material mill grinds material removed from the bed prior to returning it to the bed, the rate at which the mill operates being controlled by the extent to which the actual bed depth differs from the desired bed depth. The mill grinds some bed material to small enough size for it to be carried from the combustion chamber with the combustion gases.

14 Claims, 5 Drawing Sheets

METHOD OF CONTROLLING THE DEPTH OF A FLUIDIZED BED IN A POWER PLANT AND A POWER PLANT WITH MEANS FOR CONTROLLING THE BED DEPTH

TECHNICAL FIELD

The present invention relates to a method of controlling the bed depth in a power plant burning a sulfur-containing fuel in a fluidized bed containing a particulate sulfur-absorbing bed material. Further, it relates to a power plant with equipment for controlling the depth of the bed in dependence on the power load. By the term "power plant" is meant not only a plant which produces only heat and a plant which produces only electricity but also a combination plant that produces either or both.

BACKGROUND ART

In a fluidized bed power plant, the depth of the fluidized bed is controlled in dependence on the power used. It is necessary to maintain a certain temperature of the bed (typically of the order of magnitude of 850° C.), to obtain a good degree of combustion and the highest possible absorption of sulfur. Part of the power is taken out through a nest of tubes which cool the bed and heat water or generate steam. At full load operation, the entire nest of tubes is submerged within the bed. The cooling capacity of this nest of tubes has to be adapted to the used power in order to maintain the proper bed temperature. When the power output decreases, the fuel supply and the power development in the bed will decrease but the cooling capacity of the nest of tubes will remain unchanged, which leads to an undesired reduction of the bed temperature. The cooling capacity of the nest of tubes can be reduced by reducing the depth of the bed so that part of the nest of tubes will then be located above the top surface of the bed. In the case of a load change, the cooling capacity is controlled by varying the bed depth so that the tubes will to a certain extent be located above the top surface of the bed so as not to unduly cool the bed. In the case of capacity control, the fuel and the air quantity must be controlled in dependence on the power taken out from the plant, while at the same time controlling the bed depth so that the cooling capacity of the nest of tubes is adapted to the energy supply, thus maintaining the correct bed temperature. In the case of a plant operating at a steady power level, the depth of the bed is maintained constant.

Sulfur-absorbing bed material such as limestone or dolomite must be supplied in an amount related to the sulfur content of the supplied fuel. In order to prevent the bed depth from rising, consumed bed material, such as slag and ashes, must be removed. Fine-grained material, such as finer fractions of ashes and well comminuted bed material, leave the bed with the combustion gases, and separated therefrom in a cleaning plant for subsequent removal. To maintain the bed depth constant or to reduce the bed depth, other bed material is removed through a feeding-out device at the bottom of the combustion chamber containing the fluidized bed. Such material, after crushing which exposes unconsumed sulfur-absorbent material, can be returned to the combustion chamber, as disclosed in Brännström et al's U.S. Pat. No. 4,421,036 (assigned to the assignee of this application).

SUMMARY OF THE INVENTION

According to the present invention, the bed depth is adjustable by adjusting the capacity of a crusher or grinding device, which is directly connected to the combustion chamber both on its inlet side as well as on its outlet side. In a plant with a combustion chamber operating at a pressure exceeding atmospheric pressure (a PFBC plant) and having a combustion chamber enclosed within a pressure vessel, the crushing or grinding device is desirably positioned inside the pressure vessel. The bed material is ground to such a fineness that, when returned to the combustion chamber, the particles will be carried off with the combustion gases and separated in a dust separator. Lumps of slag removed from the bed can also be crushed since in that way fuel particles entrained within these slag lumps are exposed and will then be burnt on their return to the bed. The efficiency of fuel use can thus be improved in this way.

A certain power output of the plant corresponds to a certain specified bed depth. Therefore, in all essentials, plant control can be based on a simple measurement of the bed depth and on the control of the capacity of a bed material milling plant so as to obtain a bed depth always adapted to the existing power level. In addition, the temperature of the bed can be measured and corrections of the bed depth can be made when the bed temperature differs from specified limit values.

The bed depth can be determined in a simple manner with the aid of a number of pressure-difference sensors, which are connected to the combustion chamber at different heights above the bottom of the bed. One sensor is connected to the combustion chamber above the highest level expected by the upper surface of the bed. The other sensors can be connected to the combustion chamber in a spaced-apart arrangement between its bottom and the highest bed level expected.

The bed material mill or crusher in the plant may be located inside the combustion chamber at the bottom thereof, but is suitably positioned close to the combustion chamber, at or somewhat below the level of the bottom plate on which the fluidized bed rests. The inlet side of the mill or crusher may be directly connected to the combustion chamber wall or to the combustion chamber by means of a vertical or steeply inclined tube, opening out into the combustion chamber immediately above the bottom plate or in a conical section provided for withdrawing bed material from below the bottom plate of the chamber. The outlet side of the mill or crusher is directly connected to the combustion chamber. Crushed bed material can be returned to the bed through pneumatic conveyance.

Between the mill or crusher and the combustion chamber a cooler may be arranged, which cools the bed material before it reaches the mill, thus reducing the thermal stresses on the material from which the mill is made. An L-valve may be provided on the upstream side of the mill, by means of which the flow of bed material, and hence also the grinding capacity of the mill, can be controlled continuously or intermittently. With this valve the flow can be completely interrupted, allowing the upstream conduit and the mill to be emptied of bed material before the mill is stopped.

In a PFBC power plant, the mill is suitably placed inside the pressure vessel which surrounds the combustion chamber. The mill will then operate at approximately the same pressure level as the combustion chamber. No pressure reducing discharge sluice is then required and only insignificant power is required for the pneumatic return feed of crushed bed material to the combustion chamber.

The mill is suitably attached to the wall of the pressure vessel with the mill housing extending into the pressure vessel and the mill drive equipment located outside the pressure vessel. The opening in the pressure vessel wall should suitably have such a size that the entire mill unit can be withdrawn through the opening. The drive shaft between the rotary grinding member of the mill and the drive equipment is suitably designed as a follow shaft which is cooled by combustion air which is directed to flow axially along the shaft, both internally and externally. The capacity of the mill can be controlled by devices which control the motor speed.

The invention will be described, by way of example, in greater detail with reference to the accompanying drawings, wherein

DESCRIPTION OF THE PREFERRED EMBODIMENTS

Figure 1:
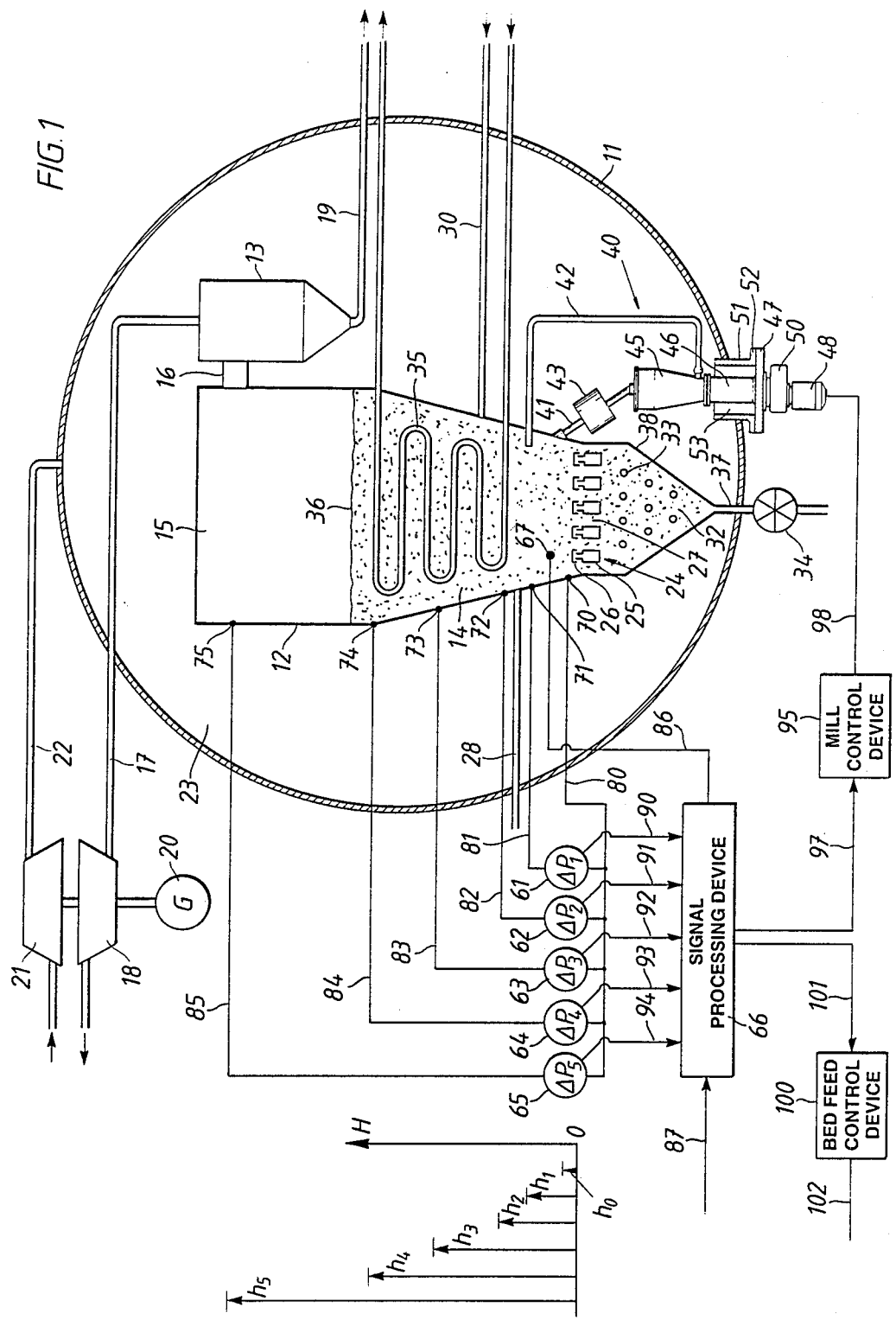
FIG. 1 shows the invention as applied to a PFBC plant.

In the drawing, 11 designates a pressure vessel, 12 a combustion chamber and 13 a gas cleaning plant, the combustion chamber and the cleaning plant being enclosed within the pressure vessel. Only one cyclone is shown in the cleaning plant, but in reality a plurality of parallel groups of series-connected cyclones will be used to form the plant 13. Fuel is burnt in a fluidized bed 14 in the combustion chamber 12. The bed 14 consists of a particulate sulfur-absorbing material, as limestone or dolomite. The major part of this material usually has a grain size of between 0.5 and 5.0 mm. Combustion gases formed are collected in a volume 15 above the bed and flow through a conduit 16 to the cleaning plant 13 where dust is separated, and flows from the plant 13 through a conduit 17 to a turbine 18 and from there, for example, to a waste heat boiler (not shown). Separated dust is fed out from the plant 13 through a conduit 17. The turbine 18 drives a compressor 21, for feeding combustion air to the vessel 11, and an electrical generator 20, which feeds electrical energy into a electricity supply network (not shown). The generator 20 can also serve as a motor for driving the compressor 21 on start-up of the plant.

The space 23 between the pressure vessel 11 and the combustion chamber 12 and the plant 13 is supplied with compressed air through the conduit 22. The pressure may amount to 2 MPa or more. The combustion chamber 12 is provided with a bottom 24 consisting of elongated air distribution chambers 25 with air nozzles 26. Through these air nozzles 26, the bed 14 is supplied with air for fluidization and for combustion of the supplied fuel.

Fuel is supplied to the bed 14 through a conduit 28 from a fuel storage means (not shown). Fresh bed material is supplied to the bed 14 through a conduit 30 from a bed material storage means (not shown). In some applications it may be preferable to feed fuel and bed material through the same conduit. Between the chambers 25 in the bottom 24, gaps 27 are provided, through which bed material from the bed 14 may fall down into a space 32 in a discharge cone 38 for bed material defining the lower part of the combustion chamber 12. In this space 32 cooling tubes 33 are provided for cooling the bed material before it is fed out through a conduit 37 and a discharge device 34.

The combustion chamber 12 accommodates a bundle of tubes 35, in which water is heated or steam is generated. The thermal power extracted from the combustion chamber by these tubes is dependent on the depth H of the bed 14. At full load the entire tube bundle 35 is located below the bed surface 36, and at partial load the bed is lowered to a new depth $H_x$ and part of the tube bundle 35 will be located above the bed surface 36. In this way, the cooling capacity of the tube bundle 35 is reduced, since the transmission of heat between a gas and the tubes occurs at a lower efficiency than the transmission of heat between the bed material and the tubes. Thus by reducing the bed depth, it is possible, at partial load, to maintain a sufficiently high temperature in the bed to ensure good combustion and sulfur absorption.

During constant load operation, the bed surface 36 has to be maintained at a constant level. Fuel and bed material are supplied continuously. The major part of the ash in the fuel and that part of the bed material which is decomposed by abrasion are so fine-grained that they accompany the combustion gases through the conduit 16 and are separated out in the cyclones of the gas cleaning plant 13 and are fed out through the conduit 19. To prevent the bed level from rising, measures must be taken to continuously remove bed material. For this purpose, a milling plant 40 is partly located in the space 23 inside the pressure vessel 11. The inlet side of this mill 40 is connected to the combustion chamber 12 by means of a conduit 41, through which bed material may run down into the mill 40, and its outlet side is connected to the combustion chamber 12 by means of a conduit 42, through which finely-crushed or ground bed material is pneumatically returned to the bed 14. By means of the crushing of the bed material, uncomsumed sulfur absorbent, which is present in the inner part of the grains of bed material, will become exposed to be effective from an absorption point of view. The fine crushing results in creation of a large effective surface area and in the bed material being well utilized in spite of a relatively short dwell time in the bed 14. For this reason, the grain size of the crushed material in the conduit 42 should be smaller than 50 microns.

Since the mill 40 is located inside the pressure vessel 11, no material sluices and energy-demanding return feed systems are needed. From the point of view of energy conservation it is desirable to carry out the crushing and the return of bed material to the bed 14 at as high a temperature as is permitted by the mill 40. The conduit 41 includes a cooler 43 for cooling the bed material to a suitable temperature. It is also possible to connect the inlet side of the mill 40 to the combustion chamber space 32 at a location below the bottom 24 chosen so that the withdrawn bed material is cooled to the suitable temperature for safe supply to the mill 40. The bed height H is controlled by adjusting the speed of a variable speed motor 48 used to drive the mill 40 so as to obtain the desired capacity for maintaining the level constant or for changing the level (for example increasing or decreasing bed depth).

The mill 40 is built up of a mill housing 45, an intermediate portion 46, a supporting plate 47 and the motor 48 with a gear unit 50. A cylinder 51 with a flange 52 is provided in the wall of the pressure vessel 11. The supporting plate 47 is attached to the flange 52 by a bolt joint. The opening 53 in the cylinder 51 is of such a size as to allow the mill housing 45 to pass through. The entire mill unit 40 can thus easily be removed and replaced.

FIG. 1 shows a number of differential pressure sensors 61–65 connected to the combustion chamber 12 at different heights. All the sensors are connected, through a conduit 80, to the combustion chamber 12 at a point 70 near the level of the bottom 24 (i.e. at the height $h_0$ above the bottom). On their other side, each sensor 61–65 is connected, through a respective conduit 81–85, to the combustion chamber 12 at points 71, 72, 73, 74 and 75 at the heights $h_1$, $h_2$, $h_3$, $h_4$, and $h_5$ above the bottom 24. The connection point 75 is made above the highest level of the bed surface 36, that is, it opens into the volume 15. The pressure sensors 61–65 are connected to a signal processing device 66 by means of lines 90–94. A temperature sensor 67 positioned in the bed 14 is connected to the signal processing device 66 by means of a line 86. A desired value, determined by the power level, is fed to the signal processing device 66 from power control equipment (not shown) through a line 87. A control device 95 for the capacity of the mill 40 is connected to the signal processing device 66 through a line 97 and to the mill 40 through a line 98. Through the line 97 information setting the desired value for the speed of the motor 48, which determines the capacity of the mill 40, is supplied. Control equipment 100 for a device (not shown) for feeding in fresh bed material is connected to the signal processing device 66 by means of a line 101 and to a discharge device (not shown) for bed material by means of a line 102.

Figure 2:
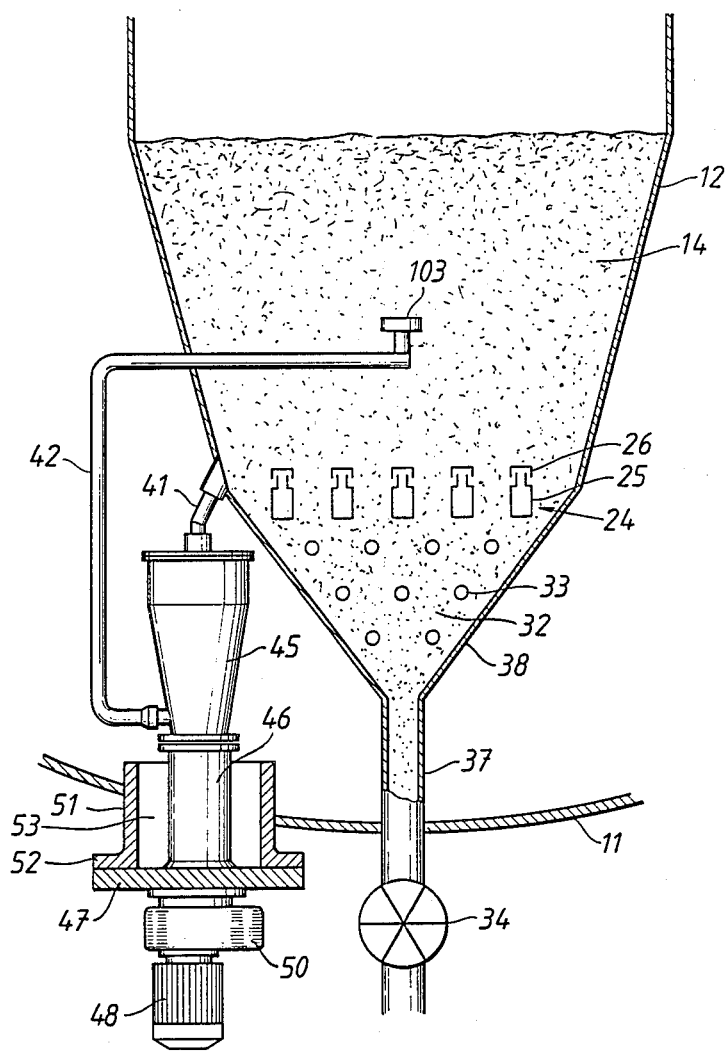
FIGS. 2-4 show different locations of a mill in relation to the combustion chamber of the plant.

FIG. 2 shows, on an enlarged scale, part of an embodiment of PFBC plant in which the mill 40 is directly connected to the combustion chamber 12 at a point close to the bottom 24. The return pipe 42 terminates in a distributor 103 for appropriate spreading of the crushed material into the bed 14. The return pipe 42 empties into the bed at a level above the conduit 41, through which the mill 40 is supplied with bed material, for it is advantageous if the pressure at the orifice of the return pipe 42 is lower than that existing at the entrance to the supply pipe 41.

Figure 3:
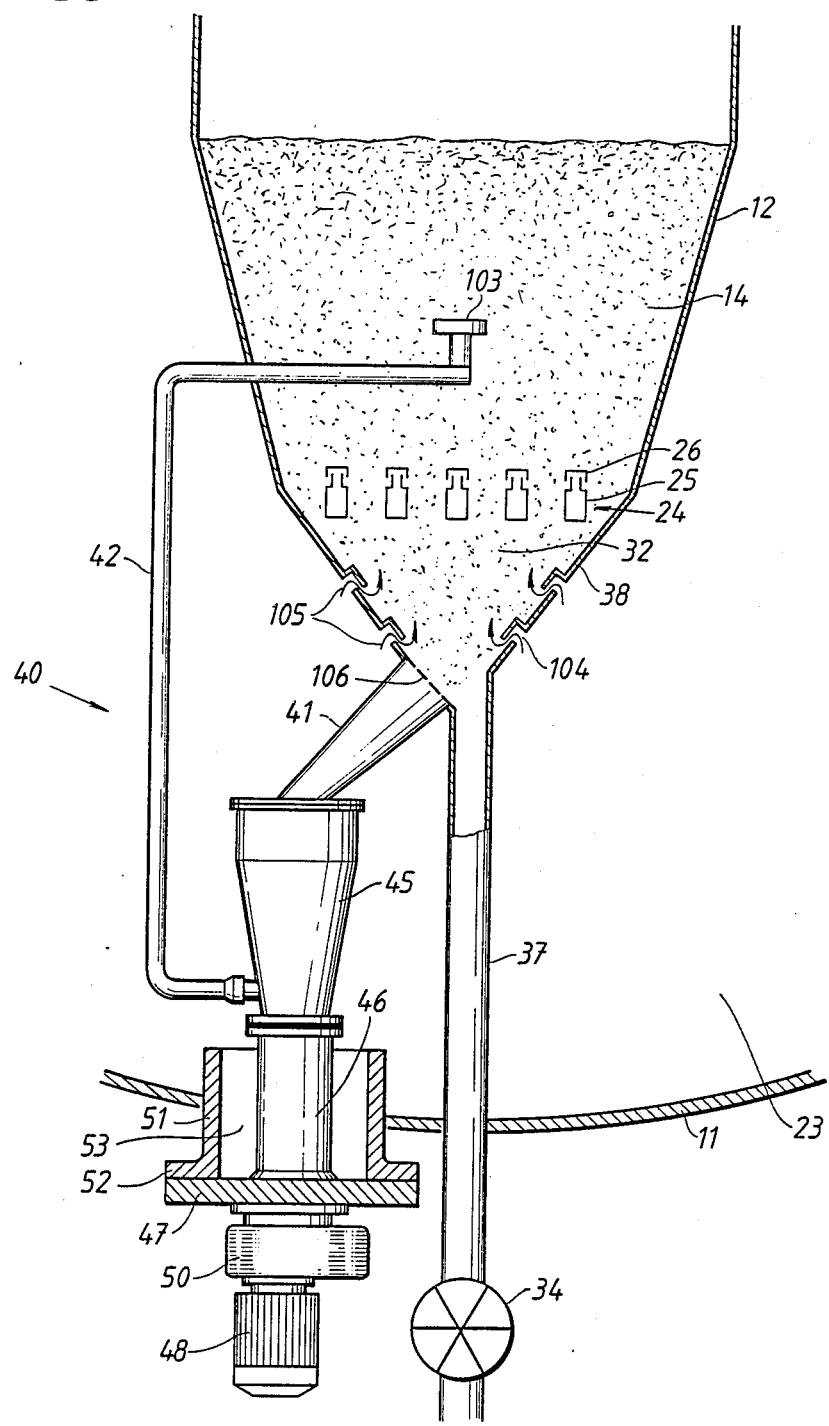

FIG. 3 shows an alternative embodiment in which the supply pipe 41 of the mill 40 is connected to the bottom part of the discharge cone 38. The walls of the cone 38 have openings 104 through which combustion air from the space 21 in the pressure vessel 11 flows in, as shown by the arrows 105. This air burns carbonized residues in the bed and cools the bed material before this material reaches the supply conduit 41 leading to the mill 40 or is removed through the conduit 37 and the sluice 34. The opening to the conduit 41 is provided with a screen 106 which prevents larger lumps (e.g. of slag) from entering the mill 40.

Figure 4:
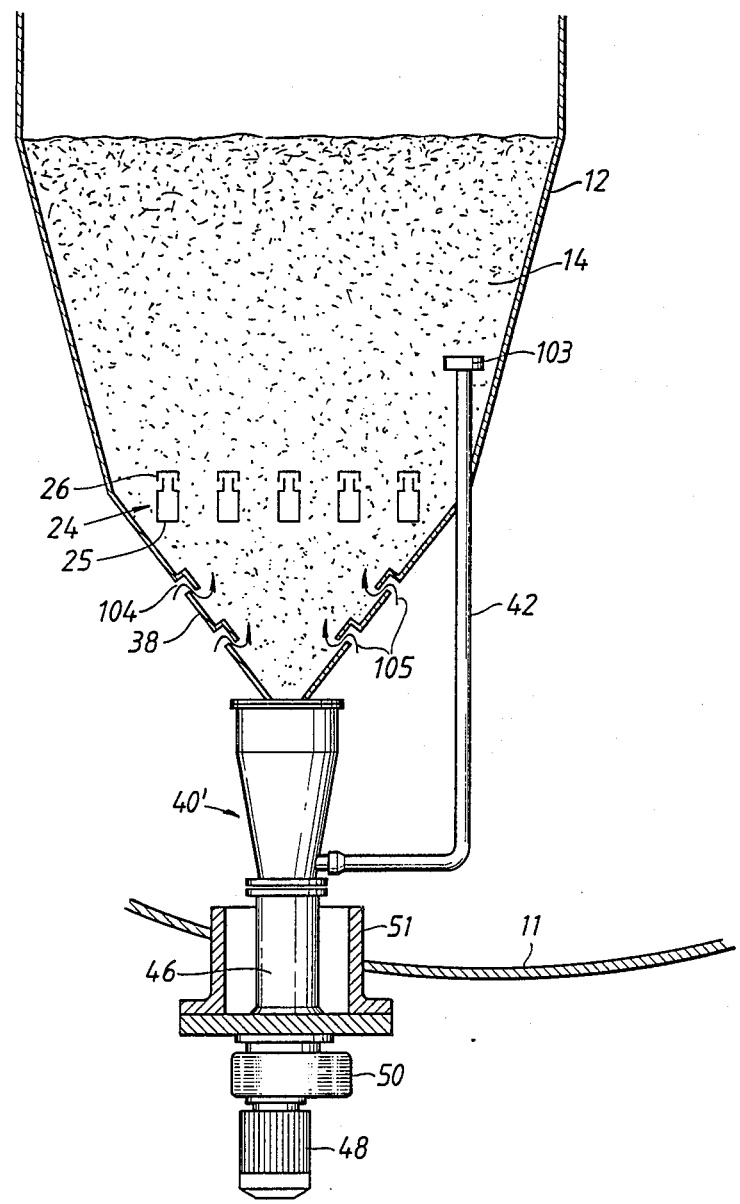

In the embodiment shown in FIG. 4 a mill 40' is directly connected to the cone 38 and constitutes the sole discharge device for bed material. The mill 40' must be designed in such a way as to be able to receive and crush larger slag lumps as well as the normal bed material.

Figure 5:
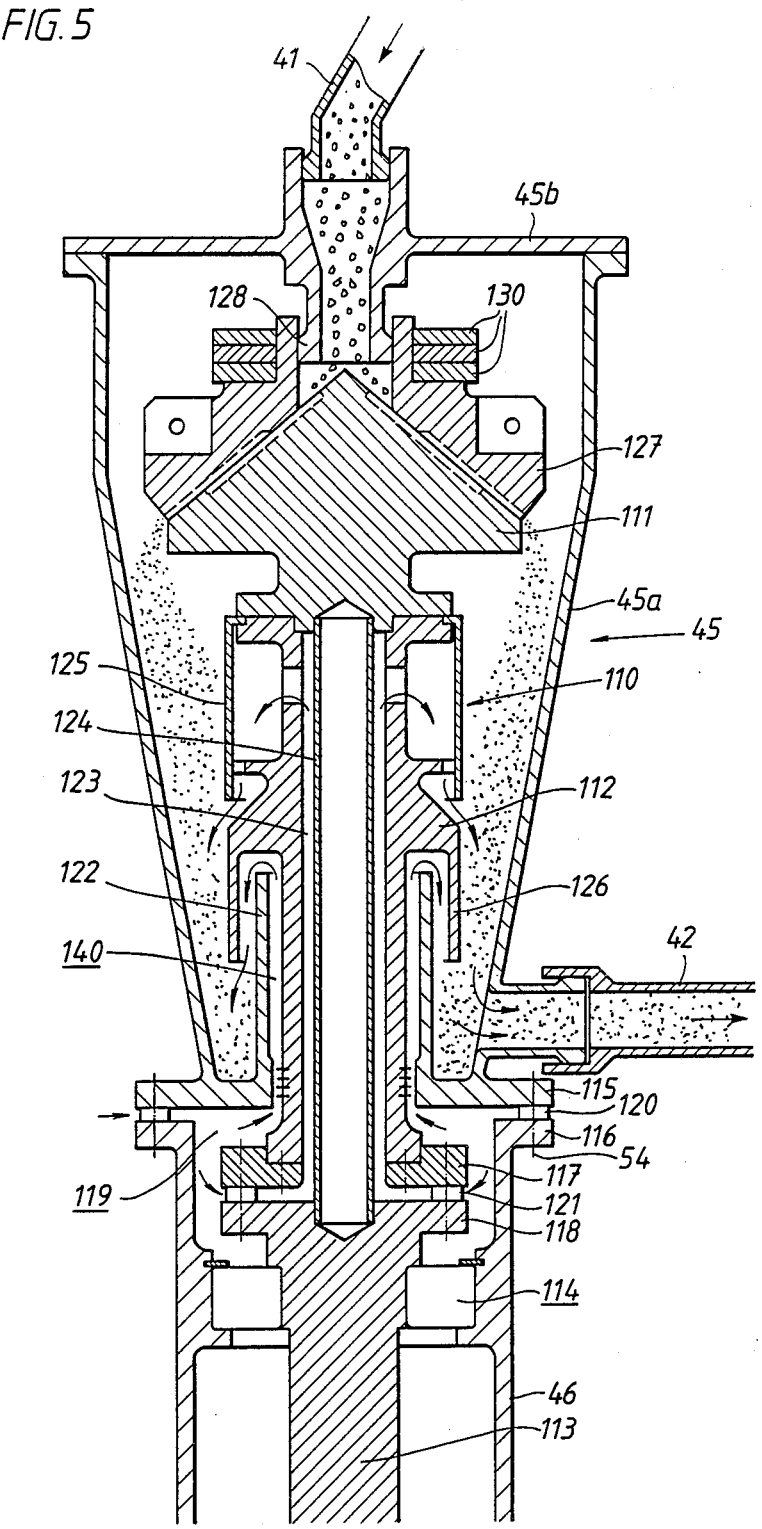
FIG. 5 shows a section of a mill.

FIG. 5 shows a section through a mill used in a method or plant according to the present invention.

In the mill shown in FIG. 5, the mill housing 45 consists of a substantially conical part 45a and a cover plate 45b. The lower part of the mill housing 45 is joined to the intermediate part 46 by a bolt joint 54. The mill housing 45 accommodates a rotor 110, which consists of a conical crusher body 111 supported by a hollow shaft 112. The hollow shaft 112 is fixed to an intermediate shaft 113 which connects the rotor 110 to the output shaft of the gear unit 50. The shaft 113 is journalled in the intermediate part 46 by means of an upper bearing 114 and a lower bearing (not shown). Spacers 120 and 121, respectively, are provided between flange 115 of the mill housing 45 and flange 116 of the intermediate part 46 and between flange 117 of the hollow shaft 112 and flange 118 of the shaft 113, respectively, these spacers 120 and 121 reducing the surface area available for heat-conduction and hence reducing the amount of heat passing from the mill housing 45 to the intermediate part 46 and from the rotor 110 to the shaft 113, respectively. Between the spacers 120 channels are formed through which air from the space 23 in the pressure vessel 11 flows into a space 119 in the intermediate part 46 and from there further into a gap 140 between a collar 122 in the housing 45 and the hollow shaft 112. From the space 119 air also flows between the spacers 121 into the hollow shaft 112 and inside this and upwards into a gap 123 between a tube 124 and the hollow shaft 112. This air cools the hollow shaft efficiently, both internally and externally. Further, the air flows through the conduit 42 together with ground material to the bed 14 and is utilized as transport gas and for combustion. Collars 125 and 126 of the hollow shaft 112 and a collar 122 of the housing 45 prevent ground material from falling down into the intermediate part 46 during a period of rest. The flow directions of the air are indicated by arrows in FIG. 5.

In the upper part of the mill housing 45 there is a second crusher body 127 which cooperates with the crusher body 111 of the rotor 110. The crusher body 127 is arranged so as to permit axial displacement thereof but is connected to the housing part 45a so as to prevent it from rotating. The crusher body 127 is centered and guided by a sleeve 128 in the cover plate 45b, which sleeve also forms a material inlet and provides connection for the material supply conduit 41 which can absorb movements caused by thermal expansion. The crusher body 127 is designed so that annular weights 130 can be placed thereupon, thus obtaining the desired degree of crushing.

The described embodiments may be varied in many ways within the scope of the following claims. Thus, for example, it is not ruled out that the bed material mill 40 be located within the combustion chamber.

What is claimed is:

1. A method of controlling the depth of a fluidized bed in a fluidized bed power plant in which sulfur-containing fuel is burned, the bed being located in a combustion chamber which is provided with nozzles for the supply of air for fluidizing of a bed of particulate sulfur-absorbing material and sulfur-containing fuel supplied to the bed, at least one conduit for supplying the bed with fuel and bed material, and a compressor for supplying the nozzles with air for the fluidization and fuel combustion, said method depending on the difference between a predetermined depth value and an actual measured depth value, said controlling comprising the steps of:

supplying fresh bed material to the bed and removing a portion of bed material from the bed by feeding bed material to crushing means directly connected to the combustion chamber by an outlet means;

returning crushed bed material from the crushing means directly to the bed through a return conduit;

controlling the flow of bed material through the crushing means in dependence on said difference between the predetermined value and the actual value of the bed depth;

removing crushed bed material from the combustion chamber with combustion gases;

separating the crushed bed material from the combustion gases in a cleaning means for separating dust from combustion gases.

2. A method according to claim 1, wherein said actual depth of the bed is measured by means of differential pressure sensors, the measured depth value is supplied to a signal processing device and compared with a desired depth value for the power output and said desired depth value deviates from the actual, measured depth, and the capacity of crushing device is adjusted in dependence on the magnitude of the deviation.

3. A method according to claim 2, wherein the temperature of the bed is measured with a sensor, the measured value of the temperature is supplied to the signal processing equipment, the measured temperature is compared with a range set by upper and lower allowed temperature limit values, whereupon the desired depth of the bed is changed if the temperature lies outside said range.

4. A method according to claim 1, wherein combustion air generated by the compressor is utilized for cooling of the crushing device.

5. A method according to claim 1, wherein combustion air is used as a transport gas for the return of crushed bed material directed from the crushing device of the bed.

6. A power plant in which a fuel containing sulfur is burnt in a fluidized bed located within a combustion chamber and provided with nozzles for distribution of air to the combustion chamber for fluidization of a bed containing particulate sulfur-absorbing material and for combustion of the fuel supplied to the bed, said plant including conduit means for supplying fuel and bed material to the bed, a gas cleaner to process combustion gases leaving the combustion chamber, and a compressor for supplying the combustion chamber with air for bed fluidization and fuel combustion;

said plant further comprising a bed material mill for crushing bed material comprising an inlet side and an outlet side, conduits connecting said inlet and said outlet of said mill in communication with the combustion chamber, means supplying compressed air to said mill for forcing crushed bed material through said mill outlet conduit and into said combustion chamber, said mill being adapted to reduce the size of the particles of the bed material to such a fineness that a portion thereof will be transported away from the combustion gases for separation therefrom in the gas cleaner.

7. A power plant according to claim 6, wherein said mill is connected at its inlet to the combustion chamber by a conduit opening out into a region of the combustion chamber where the fluidized bed will be located.

8. A power plant according to claim 6, wherein the combustion chamber is enclosed within a pressure vessel, the mill is located within the pressure vessel and drive means for the mill are located outside the pressure vessel.

9. A power plant according to claim 8, wherein said mill is attached to an opening in a wall of the pressure vessel, said opening being dimensioned to allow said mill to be withdrawn therethrough.

10. A power plant according to claim 8, wherein said mill includes a mill housing having an axis, and extending into the pressure vessel; an upper stationary grinding body with a conical grinding surface being located within said housing, said grinding body being movable to a limited extent in the direction of the axis of the housing; a rotating grinding body with a mating conical grinding surface; and a drive shaft channel for a cooling gas connecting the grinding body to the mill drive means.

11. A power plant according to the claim 10, wherein the shaft is hollow and is cooled by combustion air from the pressure vessel which is directed to flow along surfaces of the shaft.

12. A power plant according to claim 10, wherein the upper grinding body can be variable loaded by weights, said load determining the particles size of the ground particles leaving said mill.

13. A power plant according to claim 8, wherein the drive means for the mill comprises speed control equipment.

14. A power plant according to claim 6, wherein a plurality of pressure sensors for measuring the bed depth are connected to the combustion chamber at different levels above the nozzles, the uppermost sensor communicating with the volume of the combustion chamber above the highest bed level; signal processing equipment; means to feed measuring signals from the sensors to the signal processing equipment to generate a value of the actual depth of the bed, means for generating a value of the desired depth of the bed for the actual operating power output of the plant and means to compare the actual and desired values and generate a mill control signal therefrom; and control equipment which controls the operating speed of the mill on the basis of the mill control signal.

* * * * *